United States Patent
Sankaranarayanan et al.

(10) Patent No.: US 10,649,767 B2
(45) Date of Patent: May 12, 2020

(54) SYSTEM AND METHOD FOR CREATING AN INTEGRATED DIGITAL PLATFORM

(71) Applicant: Tata Consultancy Services Limited, Mumbai (IN)

(72) Inventors: Viswanathan Sankaranarayanan, Chennai (IN); Sivakumar Narendran, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/389,797

(22) Filed: Dec. 23, 2016

(65) Prior Publication Data
US 2017/0185393 A1 Jun. 29, 2017

(30) Foreign Application Priority Data
Dec. 29, 2015 (IN) .......................... 4915/MUM/2015

(51) Int. Cl.
*G06F 8/70* (2018.01)
*G06F 8/61* (2018.01)
*G06F 8/60* (2018.01)

(52) U.S. Cl.
CPC .................. *G06F 8/70* (2013.01); *G06F 8/60* (2013.01); *G06F 8/61* (2013.01)

(58) Field of Classification Search
CPC ................. G06F 8/70; G06F 8/60; G06F 8/61
See application file for complete search history.

(56) References Cited

U.S. PATENT DOCUMENTS 6,061,696 A * 5/2000 Lee .................. G06F 17/211
715/209
6,370,573 B1 * 4/2002 Bowman-Amuah ..... G06F 8/20
709/223

(Continued)

FOREIGN PATENT DOCUMENTS

CA 2848988 5/2018
CN 107409126 11/2018

(Continued)

OTHER PUBLICATIONS

Wu, "A Novel Behavior-Based User Authentication Scheme", 2015 IPFW Student Research and Creative Endeavor Symposium, 2 pages, (2015) : http://opus.ipfw.edu/cgi/viewcontent.cgi?article=1081&context=stu_symp2015.

(Continued)

*Primary Examiner* — Ziaul A Chowdhury
(74) *Attorney, Agent, or Firm* — Finnegan, Henderson, Farabow, Garrett & Dunner LLP

(57) ABSTRACT

The embodiments herein disclose a method and a system for creating a singular platform to harness a plurality of technical capabilities in order to deliver multiple digital services such as end user device management, analytics, enterprise mobility, digital identity management, smart device management and so on by orchestrating certain service related support capabilities. The embodiments function as an interface between the user equipment and the applications that are running on several operating systems. Further, an enablement platform is created and modified for a digital ecosystem that sits on the network and user equipment to act as an interface. Essentially, a flexible and extensible API driven platform capable of seamlessly integrating multiple platforms spanning across network services and functions, ana- (Continued)

lytics, device management and orchestration platforms in enabled.

15 Claims, 6 Drawing Sheets

(56) References Cited

U.S. PATENT DOCUMENTS

| | | | |
|---|---|---|---|
| 7,260,646 B1* | 8/2007 | Stefanik | G06F 8/61 709/238 |
| 7,617,293 B1* | 11/2009 | Barnes | G06F 9/5055 709/201 |
| 7,930,215 B2 | 4/2011 | Pombo et al. | |
| 8,140,987 B2 | 3/2012 | Keren et al. | |
| 8,204,870 B2 | 6/2012 | Mukkamala et al. | |
| 8,667,556 B2 | 3/2014 | Chang et al. | |
| 8,776,011 B2 | 7/2014 | Sharma et al. | |
| 8,800,042 B2* | 8/2014 | Sima | G06F 11/3664 717/168 |
| 9,053,307 B1 | 6/2015 | Johansson et al. | |
| 9,210,252 B2* | 12/2015 | Batni | H04M 1/72566 |
| 9,235,442 B2 | 1/2016 | Kampas et al. | |
| 9,251,498 B2* | 2/2016 | Khasnis | G06F 8/61 |
| 9,536,081 B2 | 1/2017 | Fiala et al. | |
| 9,679,332 B2 | 6/2017 | Kim et al. | |
| 9,753,702 B2* | 9/2017 | Hershenson | G06F 8/38 |
| 9,817,646 B1* | 11/2017 | Chen | G06F 8/61 |
| 9,817,657 B2* | 11/2017 | Hill | G06F 8/70 |
| 9,965,724 B2 | 5/2018 | Brown et al. | |
| 10,073,605 B2 | 9/2018 | Ellison et al. | |
| 10,079,859 B2 | 9/2018 | Lang et al. | |
| 10,116,670 B2 | 10/2018 | Muddu et al. | |
| 10,216,485 B2* | 2/2019 | Misra | H04L 67/12 |
| 10,319,022 B2 | 6/2019 | Clayton et al. | |
| 10,341,171 B2 | 7/2019 | Khalsa et al. | |
| 2003/0037173 A1* | 2/2003 | Pace | G06F 8/60 719/310 |
| 2003/0074360 A1* | 4/2003 | Chen | G06F 8/60 |
| 2005/0267913 A1* | 12/2005 | Stienhans | G06F 8/38 |
| 2005/0278297 A1* | 12/2005 | Nelson | G06F 17/3089 |
| 2006/0036745 A1* | 2/2006 | Stienhans | G06F 8/38 709/228 |
| 2006/0155387 A1* | 7/2006 | Pieronek | G05B 19/042 700/1 |
| 2006/0277231 A1* | 12/2006 | Kral | G06F 8/70 708/102 |
| 2007/0089151 A1* | 4/2007 | Moore | G11B 27/034 725/132 |
| 2007/0157202 A1* | 7/2007 | Moir | G06F 9/52 718/100 |
| 2008/0005729 A1* | 1/2008 | Harvey | G06F 8/61 717/155 |
| 2008/0082535 A1* | 4/2008 | Eigemann | G06F 8/38 |
| 2008/0275939 A1* | 11/2008 | Martin | G06F 8/61 709/203 |
| 2010/0049874 A1 | 2/2010 | Chene et al. | |
| 2010/0064357 A1* | 3/2010 | Baird | G06F 8/30 726/6 |
| 2010/0122329 A1 | 5/2010 | Jakobsson et al. | |
| 2010/0229081 A1* | 9/2010 | Rothbucher | G06F 17/3089 715/205 |
| 2011/0010243 A1 | 1/2011 | Wilburn et al. | |
| 2011/0208788 A1* | 8/2011 | Heller | G06F 8/10 707/810 |
| 2012/0069131 A1* | 3/2012 | Abelow | G06Q 10/067 348/14.01 |
| 2012/0102485 A1* | 4/2012 | Goldman | G06F 9/44526 717/176 |
| 2014/0026113 A1* | 1/2014 | Farooqi | G06F 8/36 717/107 |
| 2014/0059513 A1* | 2/2014 | Sabo | G06F 8/70 717/101 |
| 2014/0189136 A1* | 7/2014 | Bryan | H04L 29/06326 709/228 |
| 2014/0244488 A1 | 8/2014 | Kim et al. | |
| 2014/0282395 A1* | 9/2014 | Wang | G06F 8/71 717/120 |
| 2014/0317595 A1* | 10/2014 | Kilby | G06Q 10/06316 717/105 |
| 2015/0143267 A1* | 5/2015 | Nair | G06Q 10/06 715/762 |
| 2016/0094394 A1* | 3/2016 | Sharma | H04L 41/0806 709/223 |
| 2016/0132199 A1 | 5/2016 | Wilburn et al. | |
| 2017/0039038 A1* | 2/2017 | Huber | G06F 8/34 |

FOREIGN PATENT DOCUMENTS

| | | |
|---|---|---|
| RU | 2468419 | 11/2012 |
| RU | 2469383 | 12/2012 |
| WO | WO 2013/009683 | 1/2013 |

OTHER PUBLICATIONS

Mineraud, J. et al. (2016). "A gap analysis of Internet-of-Things platforms," arXiv, retrieved from https://arxiv.org/pdf/1502.01181 (15 pages).

Siddiqa, A. et al. (2016). "A survey of big data management: Taxonomy and state-of-the-art," *J. Network & Computer Applications*, vol. 71, pp. 151-166.

* cited by examiner

SYSTEM AND METHOD FOR CREATING AN INTEGRATED DIGITAL PLATFORM

PRIORITY CLAIM

This application claims priority under 35 U.S.C. § 119 from India Application No. 4915/MUM/2015, filed on Dec. 29, 2015. The entire contents of the aforementioned application are incorporated herein by reference.

TECHNICAL FIELD

The embodiments herein generally relate to digital telecommunications, and more particularly, to creating an integrated digital platform as a flexible and extensible Applications Programming Interface (API) driven platform that is capable of seamlessly integrating a plurality of functional platforms across network services and functions.

BACKGROUND

The present approach in the development of modern web applications—and in particular of those applications commonly referred to as Web 2.0 applications clearly points towards a high end user involvement. An emerging "user intensive" practice today is the development of online applications starting from contents and functionality that are available online in the form of Open APIs or re-usable services. This phenomenon is commonly known as web mashups, and it shows that web users are increasingly putting efforts in the development process of web applications in addition to content creation process.

In web development, a mashup is a web page or application that uses and combines data, presentation or functionality from two or more sources to create new services. The term implies easy, fast integration, frequently using open APIs and data sources to produce enriched results that were not necessarily the original reason for producing the raw source data. The primary character of the mashups are combination, visualization and aggregation.

With the emerging Web 2.0 market place, operators have a wealth of content associated with their network along with core network enablers such as call control, presence and messaging, which could serve as potential new revenue streams in a Web 2.0 world. Moreover, with the looming threat from Internet companies, there is an increasing need for operators to make both core and value-added functions reusable and mashable.

Similarly, from a practical point of view, telecom mashup otherwise generally referred to as a landscape means some combination of applications. For the telecom mashups, it is difficult to envisage a whole application as a monolithic system since it triggers a complexity of development, lack of proper description for whole business process, lack of expertise and so on. The monolithic system may also not work since the underlying telecom functionalities are usually different in the applications development mashups play the same or almost similar role as components on low level programming. With telecom mashup development, systems are assembled from individual blocks and those blocks can be treated as programming components since they have a higher and bigger range of integration.

Currently, digital revolution has led to blurring and masking of hitherto traditional industry boundaries leading to the rise of ecosystems. A network/connected relying ecosystem on connectivity and network services includes multiple layers spanning consumers, enterprises, governments and communities contributes towards net economic value addition. Ecosystems are best served by a suite of platform services and service aggregation is the key to driving economic value in the ecosystem. However, there continues to be a lack of single aggregated platform functioning as an integrated enablement kit that is capable of delivering pan-industry digital services leveraging synergies in terms of technical functionalities across a common industry.

In an existing technique, an extensible content delivery platform is provided upon which applications and services can be built around underlying content to be served. Rich and well-formed metadata and "metacode" can be associated with content and/or requests in a consistent and programmatic manner. However, this existing technique is limited to working as a content delivery platform primarily focusing on content delivery as to digital services delivery spanning content, enterprise mobility, end point device management, digital identity and analytics from a single platform.

In another existing technique, a system, method, and computer program product are provided for developing a portable software application. The method includes the steps of defining a project, adding a screen to the project, where the screen is defined as a generic screen or a platform-specific screen, and further includes adding a component to the screen, the component being defined as a generic component or a platform-specific component. However, this existing technique does not include service or functional application deployment on a cloud model and is not related to Open API deployment.

In light of the aforementioned methods, existing application development methods are either rudimentary or do not provide a full scale digital enablement integration mechanism. Further, some of these current transaction methods are also not wholly capable on focusing on common capabilities which are essential to deliver pan industry digital services.

SUMMARY

In accordance with one embodiment, a computer implemented system for creating an integrated digital platform is disclosed, the system comprises an enablement kit module for linking at least one of a subscriber provider and a digital service provider. The enablement kit includes at least one of a digital application module, an operations application module, a digital support module, an application orchestration module, and a service management module. The digital application module is configured to develop a plurality of application specific functions wherein said application function is invoked upon triggering of a pre-requisite condition. The operations application module is configured to check whether an invoking mechanism is triggered and maintain functioning of the invoking mechanism. The digital support module is configured to provide connectivity and maintain plurality of application configuration parameters for supporting a network infrastructure of the integrated digital platform.

Further, the application orchestrator module is configured to provide an intelligent schema based on a request of the subscriber provider to create a deployable integrated digital platform; and the service management module is configured to maintain installation package of the application support module and is invoked upon a trigger from the application orchestration module.

In another embodiment, a computer implemented method for creating an integrated digital platform is disclosed, the method comprising of linking at least one of a subscriber provider and a digital service provider by an enablement kit module, and developing a plurality of application specific functions wherein the application function is invoked upon triggering of a pre-requisite condition by a digital application module.

Further, the method includes determining whether an invoking mechanism is triggered and maintaining functioning of an invoking mechanism by an operations application module; along with providing connectivity and maintaining plurality of application configuration parameters for supporting a network infrastructure of the integrated digital platform. Furthermore, the method includes providing an intelligent schema based on a request of the subscriber provider to create a deployable integrated digital platform; and maintaining an installation package of the application support module and invoking the application specific functions upon a trigger from the application orchestration module.

BRIEF DESCRIPTION OF THE DRAWINGS

The embodiments herein will be better understood from the following detailed description with reference to the drawings, in which.

DETAILED DESCRIPTION

Figure 1:
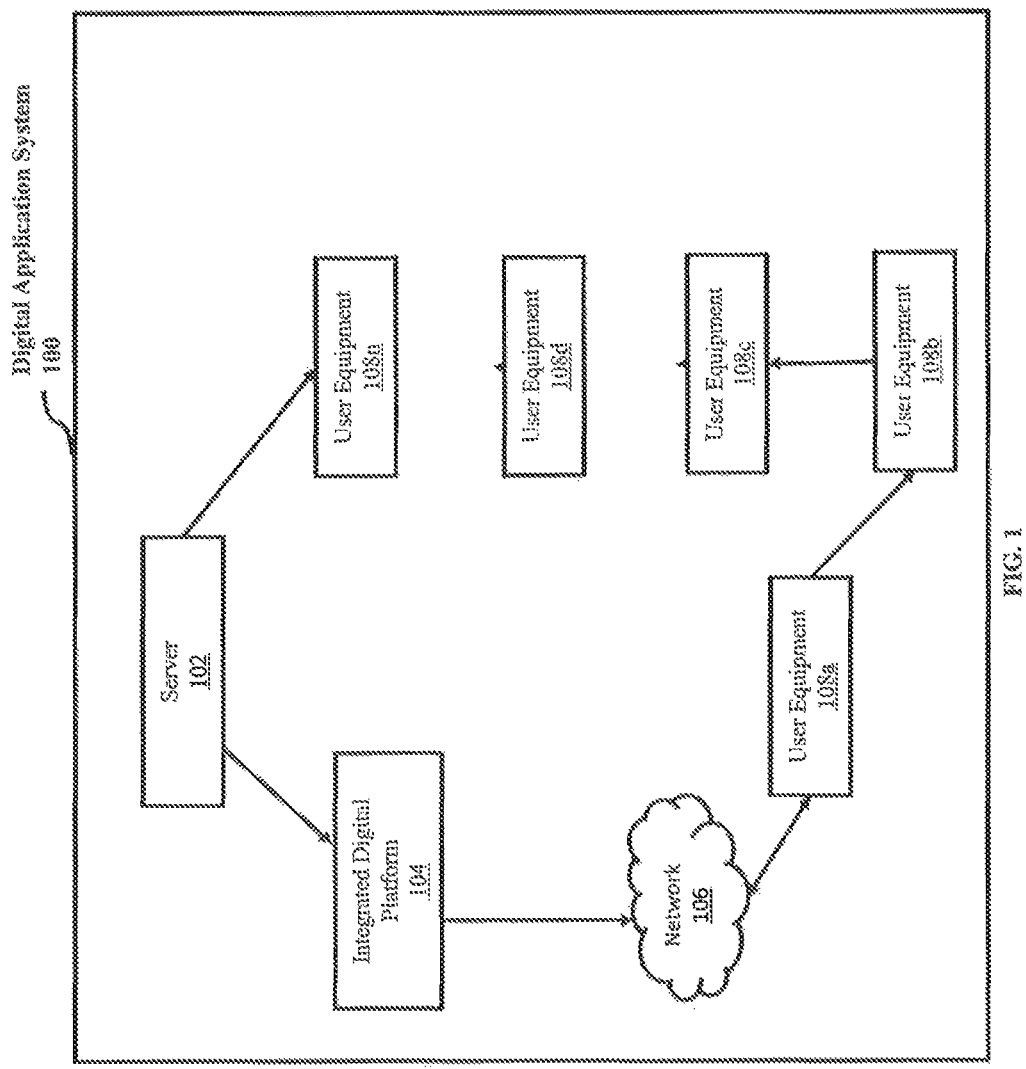
FIG. 1 is a block diagram depicting the computing architecture view of a Digital Application System, according to the embodiments as disclosed herein.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein disclose a system and a method to create, facilitate and modify a single integrated digital platform that focusses on harnessing common functionalities/technical capabilities which are considered essential to deliver a plurality of digital services such as End user device management, analytics, enterprise mobility, digital identity management, smart device management by orchestrating the business and service capabilities.

The embodiments herein further disclose exploiting an enablement platform for a plurality of Digital ecosystems that sits on the network infrastructure and other smart computing devices by acting as a (communication) interface between a plurality of devices and connected applications. The enablement platform is capable of leveraging the technical capabilities of a network, infrastructure, and smart devices to provide a platform to the end application developers to develop applications suitable for various industries.

FIG. 1 is a block diagram depicting a computing architecture view of a Digital Application System 100, according to the embodiments as disclosed herein. As depicted in FIG. 1, the Digital Application System 100 comprises of a Server 102, an Integrated Digital Platform 104, a Network 106, which are in turn connected to a plurality of computing devices such as User Equipment 108a, 108b, 108c, 108d, to 108n.

In an embodiment, the Digital Application System 100 is connected to a plurality of user equipment 108a, 108b, 108c, 108d, ... 108-N, collectively referred to as the user equipment 108 and individually referred to as a user equipment 108. The Digital Application System 100 and the user equipment 108 may be implemented as any of a variety of conventional computing devices, including, for example, servers, a desktop PC, a notebook or portable computer, a workstation, a mainframe computer, a mobile computing device, an entertainment device, and an internet appliance.

The Digital Application System 100 is connected to the user equipment 108 over the Network 106 through one or more communication links. The communication links between the Digital Application System 100 and the user equipment 108 are enabled through a desired form of communication, for example, via dial-up modem connections, cable links, digital subscriber lines (DSL), wireless or satellite links, or any other suitable form of communication.

The Network 106 may be a wireless network, a wired network, or a combination thereof. The Network 106 can also be an individual network or a collection of many such individual networks, interconnected with each other and functioning as a single large network, e.g., the Internet or an intranet. The Network 106 can be implemented as one of the different types of networks, such as intranet, Local Area Network (LAN), Wide Area Network (WAN), the internet, and such. The Network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the Network 106 may include network devices, such as network switches, hubs, routers, Host Bus Adapters (HBAs), for providing a link between the Digital Application system 102 and the user equipment 108. The network devices within the network 106 may interact with the Digital Application System 100 and the user equipment 108 through the communication links.

In one implementation, the network 106 can be a company network, including office personal computers, laptops, various servers, such as blade servers, and other computing devices connected over the network 106. In another implementation, the network 106 can be the size of a home network, with a limited number of personal computers and laptops connected over the network 106.

The Digital Application System 100 is adapted to be a flexible and extensible Application Program Interface (API) platform with an enhanced plug and play capability for the connected User Equipment 108. The Digital Application System 100 is capable of seamlessly integrating multiple platforms that span across the network 106 including but not limited to analytics, device management, and orchestration platforms. Further, the Digital Application System 100 is capable of facilitating enterprises and customers to develop a plurality of interconnected end applications such as for example, Remote thermostat control, smart refrigerator, smart grid solution, or smart waste management solutions.

In an embodiment, the Digital Application System 100 comprises of at least two layers namely a top layer (not shown in FIG. 1) and an enablement layer (not shown in FIG. 1). The top layer includes specific capabilities orchestrated to deliver an end solution and an enablement layer that provides a bouquet of common support/enabler capabilities.

In another embodiment, the Digital Application System 100 comprises at least one of the following service lines namely Digital Identity Management, end user device access management, enterprise mobility, video solutions, connected solutions, smart device ecosystem, partner ecosystem, and service co-creation ecosystem. The afore mentioned service lines are detailed below:
  a) Digital Identity Management: The Digital Application System 100 provides a plurality of digital management capabilities for accessing, delivering, and personalizing enterprise services.
  b) End user device access management: The Digital Application System 100 is capable of effectively designing, managing, and controlling the access of end point devices that span personal and end point devices in the network 106.
  c) Enterprise Mobility: The Digital Application System 100 enables real time performances by helping conduct business implementations from any location while meeting security and compliance mandates.
  d) Video Solutions: The Digital Application System 100 provides a set of content management capabilities to effectively manage and deliver content including video assets to the user equipment 108.
  e) Connected solutions: The Digital Application System 100 leverages digital forces and solutions that include connectivity of vehicles and homes to span industry verticals.
  f) Smart device ecosystem: The Digital Application System 100 is capable of designing, managing, and controlling heterogeneous devices, connections and services in a seamless manner.
  g) Partner ecosystem: The Digital Application System 100 facilitates multiple services from multiple digital enterprises and partners to be offered to end customers, in a bundled or standalone manner.
  h) Service co-creation ecosystem: The Digital Application System 100 enables end users and enterprises to effectively create an end user application at any point of time by utilizing the flexible and extensible API driven Integrated Digital Platform 104.

In order to offer various end applications across a plurality of service lines, an enterprise needs to acquire a plurality of digital enablement capabilities. For example, in order to develop a bring your own device (BYOD) application, it is necessary to initially develop or acquire a plurality of digital capabilities such as device analytics, remote action security, security support, billing, regulatory, compliance, and so on.

In another example, device management, security support and billing are few of the common technical capabilities/functionalities that are required to develop a plurality of applications across service lines such as Access device management, connected services, smart device, and partner management by the Digital Application System 100.

Figure 2:
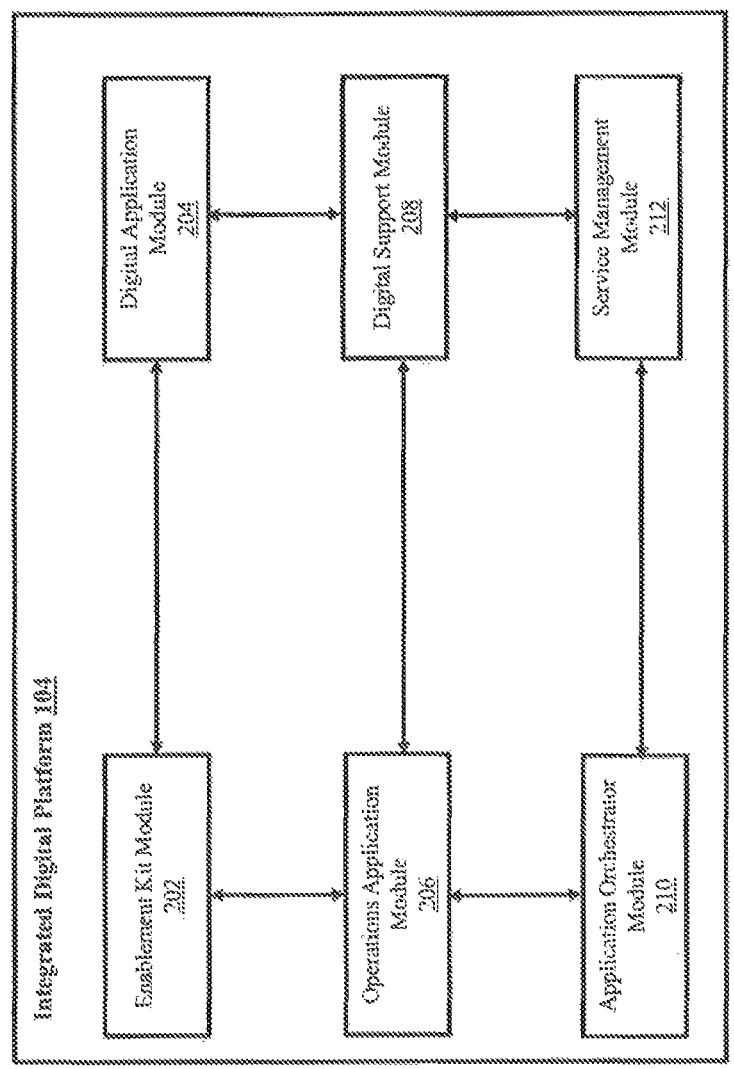
FIG. 2 is a schematic diagram depicting the architecture view of the Integrated Digital Platform 106, according to the embodiments as disclosed herein.

FIG. 2 is a schematic diagram depicting the architecture view of the Integrated Digital Platform 106, according to the embodiments as disclosed herein. As depicted in the FIG. 2, the integrated digital platform 106 comprises of an enablement kit module 202, a digital application module 204, an operations application module 206, a digital support module 208, an application orchestrator module 210, and a service management module 212.

The enablement kit module 202 is configured for linking at least one of a subscriber provider and a digital service provider. The enablement kit includes the digital application module 204, the operations application module 206, the digital support module 208, the application orchestration module 210, and the service management module 212. In an embodiment, the enablement kit module 202 may comprise, for example certain predefined digital services schemas such as a SmartHome (IoT connected house) or a VirtualOffice (IoT connected Office). The schema is configured to operate upon predefined configurations. The enablement kit module 202 gets activated upon these predefined configurations to deliver the SmartHome or VirtualOffice digital service The digital application module 204 is configured to develop a plurality of application specific functions and the application specific function is invoked upon triggering of a pre-requisite condition. Further, the operations application module 206 is configured to check whether an invoking mechanism is triggered to maintain functioning of the invoking mechanism;

The digital support module 208 is configured to provide connectivity and to maintain plurality of application configuration parameters for supporting a network infrastructure of the integrated digital platform 106. Further, the application orchestrator module 210 is configured to provide an intelligent schema based on a request of a subscriber provider to create a deployable integrated digital platform; and the service management module 212 is configured to maintain installation package of the digital support module 208 which is invoked upon a trigger from the application orchestration module 210.

In an embodiment, the operations application module 206 is configured to manage a plurality of services across and external to the integrated digital platform 106. The operations applications module 206 includes various sub entities such as a service registry, a service controller, a service lifecycle management module, a service orchestration module, and a service interfaces management module.

The operations application module 206 maintains a registry of all catalogued services and enables application in an application suite to subscribe/unsubscribe certain enabling services by the other enabling layers in the integrated digital platform 106. Additionally, the operations application module 206 provides a plurality of technical capabilities to handle certain service subscriptions, service assurances, service management, service charging and rating, along with service performance management. Service lifecycle management by the operations application module 206 deals with managing end to end lifecycle of services spanning at least one of service design, enablement, monitoring and activation/deactivation of services.

The operations application module 206 also handles service orchestration by providing a plurality of aligned technical capabilities to chain platform services in order to deliver an outcome and perform interoperability management to harmonize service delivery.

The operations application module 206 acts a service management interface by providing a plurality of capabilities to externalize platform services as APIs by providing proxy management support in case services are exposed to the public.

In an embodiment, the digital support module 208 is capable of facilitating certain support services such as process management, security support, problem management, order management, performance management, platform OSS and Machine to Machine services (M2M). Process management by the digital support module 208 involves providing technical capabilities to model processes flows and execution environment for the modelled processes. The digital support module 208 also facilitates security support by providing a suite of security management capabilities spanning authentication, authorization and accounting, identity management, key exchange management, license management, and trust and reputation management.

The digital support module 208 facilitates problem management, order management and performance management for managing related technical capabilities to handle device management, internet of things, and M2M scenarios. Further, the digital support module 208 also provides operational support capabilities in order to perform zero touch configuration and upgrades management, policy management and remote problem and diagnostics spanning device management, IoT and M2M scenarios. The digital support module 208 handles a set of machine to machine services management capabilities by performing integrity management and atomicity enforcement of a plurality of M2M transactions, Quality of Service (QoS) based layer transport services, reachability, addressing and repository services, and communication selection services spanning Bluetooth, Zigbee, and so on.

Further, the digital support module 208 also includes a central provisioning support console for provisioning devices, services, and applications. Additionally, consumption management that is maintaining metering and charging of services consumed and handling work order and field force management are handled by the digital support module 208.

The digital support module 208 also comprises a communication selection interface that helps in sensing the interface for communicating with the user equipment 108.

In an embodiment, the digital application module 204 manages a plurality of services including but not limited to billing, sales management, charging and policy management, fraud, regulatory and compliance and channels support services spanning Point of Sale (POS), online, telesales, and so on.

In another embodiment, the digital application module 204 handles content management application capabilities including but not limited to storage and discovery, automated publishing and delivery, rights management, workflow management, feeds management, analytics and reporting, and related activities.

Further, the digital application module 204 also handles other security capabilities such as firewall management, data protection, and encryption/decryption.

Overall, in an applications layer, a set of application capabilities with defined outcomes are achieved by orchestrating relevant capabilities of the digital application module 204. The digital application module 204 also includes an enterprise application store for providing a suite of capabilities involving catalog management, multiplatform support, native client support, and notifications support. A focused or a streamlined set of analytics capabilities spanning log analytics, device analytics, usage analytics, and presence analytics are handled by the digital application module 204.

Figure 3:
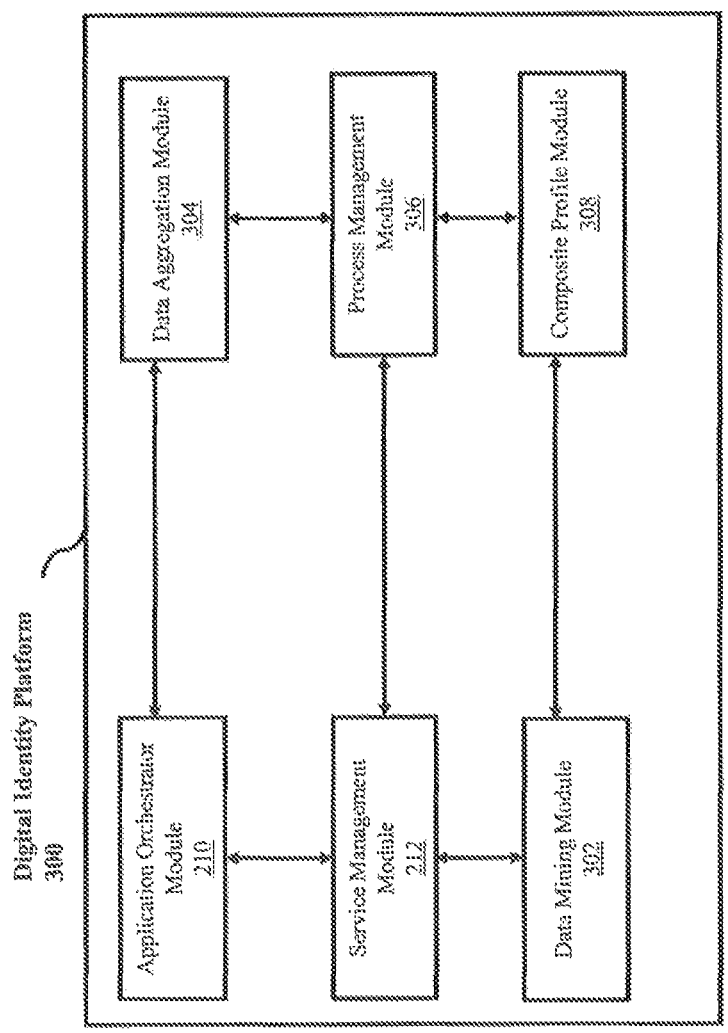
FIG. 3 is a schematic diagram depicting the architecture view of the Digital Identity Platform 300, according to the embodiments as disclosed herein.

FIG. 3 is a schematic diagram depicting the architecture view of the Digital Identity Platform 300, according to the embodiments as disclosed herein. As depicted in FIG. 3, the digital identity platform 300 comprises of an application orchestrator module 210, a service management module 212, a data mining module 302, a data aggregation module 304, a process management module 306, and a composite profile module 308.

In a general sense, the application orchestrator module 210 handles the automated arrangement, coordination, and management of complex processes, middleware, and services. In an embodiment, the application orchestrator module 210 acts as a cloud orchestrator by managing the interconnections and interactions among cloud based and on premises service units. The application orchestrator module 210 comprises the following components such as a business template, an application component registry, a global dependency mapping module, and a global work package builder.

In the digital identity platform 300, the service management module 212 manages and monitors the network 106, systems, and related applications to enable network providers to better orchestrate and automate provisioning of resources. The service management module 212 comprises of a local template, a local component registry, a local dependency mapping, and a local work package builder.

The data mining module 302 involves the integration of top down and bottom up data mining techniques in order to extract predictive models from a data source. A data source is selected and used to construct a target data set. In the digital identity platform 300, the data mining module 302 performs the main task of attribute acquisition by attribute mining. Attribute mining by the data mining module 302 involves attribute classification and attribute transformation that also involve pattern matching, and data transformation. The data mining module 302 performs data transformation by using an attribute extraction engine, a schema mapping module, and a rules engine. These attributes may be related to one individual, a set of individuals, an enterprise or a set of enterprises.

The data aggregation module 304 gathers and expresses information in a summary form for purposes such as statistical analysis. The data aggregation module 304 searches databases and finds relevant search query data and presents the data findings in a summarized format for the end user or application. The data aggregation module 304 includes an aggregated data hub, a data cleansing and cleaning module that performs schema validation, constraints enforcement, schema extraction, and instance extraction.

The composite profile module 308 performs data profiling by examining data available in an existing data source such as a database or a file and collecting relevant statistics and information about that data. In an embodiment, the composite profile module 308 is configured to identify a plurality of business rules violations and anomalies. Certain metrics are identified to assess data quality and help determine whether or not metadata accurately describes the source data. Profiling tools in the composite profile module 308 evaluate the actual content, structure and quality of the data by exploring (for example) relationships that exist between value collections both within and across data sets.

Additionally, the composite profile module 308 encrypts digital identities of individuals and enterprises along with maintaining and beefing security by certain data protection techniques. The composite profile module 308 comprises of an identity enablement interface and an identity lifecycle management module that acts a locally cached ID hub. The identity lifecycle management module also includes a tokenizer and a profile metadata generator.

Figure 4:
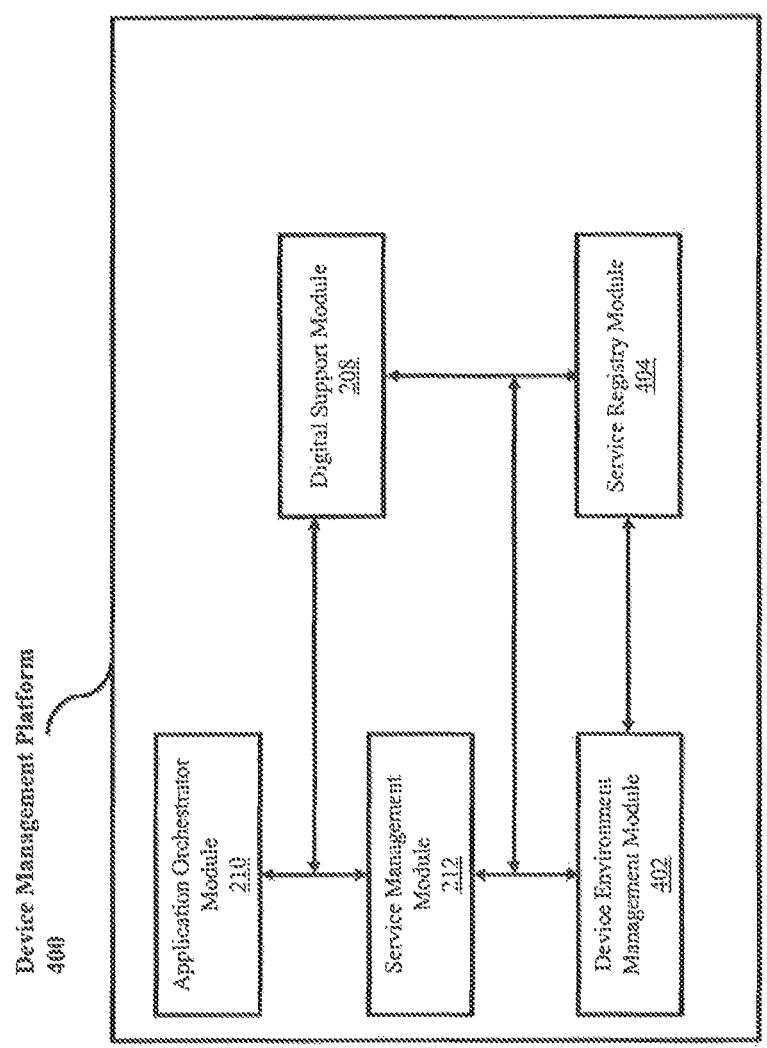
FIG. 4 is a schematic diagram depicting the architecture view of the Device Management Platform, according to the embodiments as disclosed herein.

FIG. 4 is a schematic diagram depicting the architecture view of the Device Management Platform 400, according to the embodiments as disclosed herein. As depicted in FIG. 4, the device management platform 400 comprises of the application orchestrator module 210, the service management module 212, a device environment management module 402, the digital support module 208, and a service registry module 404.

In the device management platform 400, the application orchestrator module 210 consolidates the setting up and provisioning of the user equipment 108 in the network 106 by centralizing and streamlining the process of device management. The application orchestrator module 210 works as a real time network management based solution that facilitates in class configuration, provisioning, and troubleshooting for different network devices and technologies. Further, the application orchestrator module 210 facilitates complex network set up through simplified intuitive wizards and easy to use templates.

The service management module 212 helps monitor, manage, and secure the user equipment 108 that are deployed across the network 106 to deploy and support corporate applications. Further, the service management module 212 also manages enterprise endpoint security, intrusion, detection and prevention to ensure that user equipment 108 is continuously connected to the network 106.

The device environment management module 402 maintains the environment of the user equipment 108 by managing data, upgrading, and updating on a regular basis. Sandbox management techniques and other relevant techniques are implemented to maintain smooth functioning of the user equipment.

The digital support module 208 performs complex event processing such as triggering or invoking certain services, networks, devices, and sensors. The digital support module 208 also handles provisioning and consumption management related issues. Additionally, the digital support module 208 provides security support by offering improved authentication, authorization, and accounting, and enhanced license management and identity management techniques.

The service registry module 404 facilitates controlled access to data necessary for governance of certain service oriented architecture projects. In an embodiment, the service registry module 404 allows a participating enterprise to discover and use current and relevant information more quickly than conventional techniques.

Figure 5:
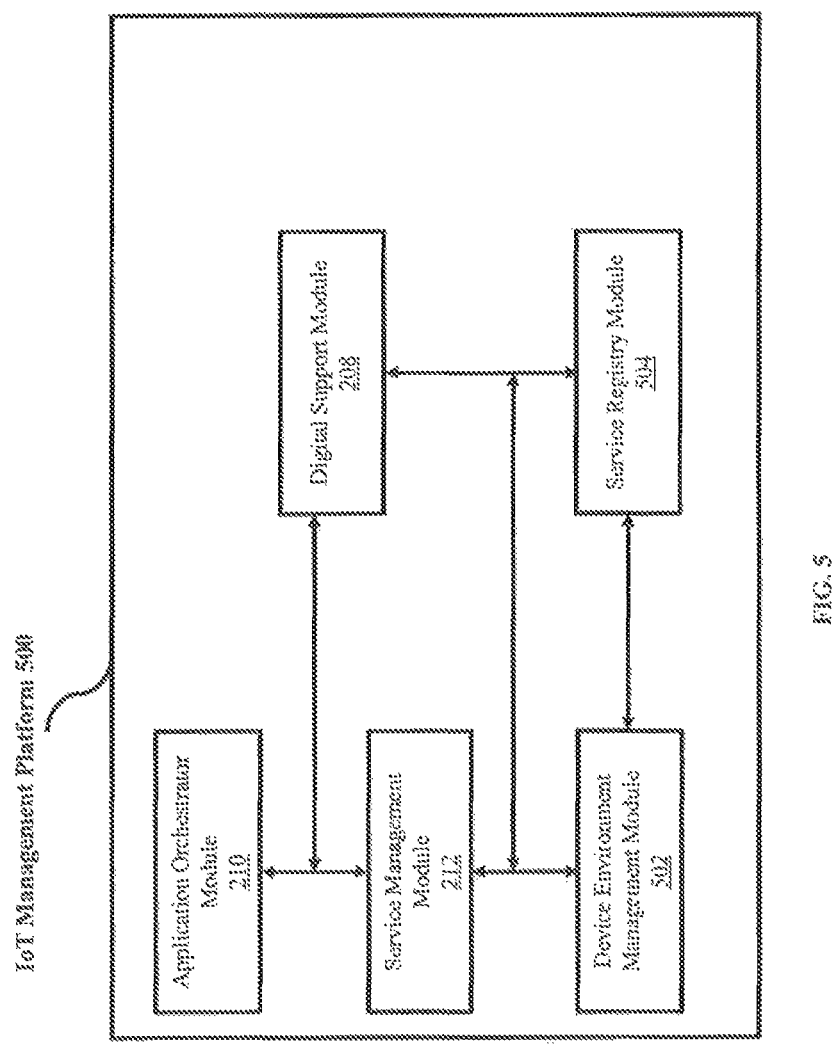
FIG. 5 is a schematic diagram depicting the architecture view of the IoT management platform 500, according to the embodiments as disclosed herein.

FIG. 5 is a schematic diagram depicting the architecture view of the IoT management platform 500, according to the embodiments as disclosed herein. As depicted the IoT management platform 500, comprises of the application orchestrator module 210, the service management module 212, the digital support module 208, the device environment management module 502, and the service registry module 504. In the IoT management platform 500, the application orchestrator module 210 is responsible for maintaining connectivity, contextual data and process execution, and smoothly handling manufacturer/service provider functions. For example, the application orchestrator module 210 accepts, translates, processes, and responds to touch points that communicate differently via different protocols.

The service management module 212 maintains and handles a plurality of functions including but not limited to service lifecycle management, service interface management, and service orchestration. Service lifecycle management includes service enablement and service monitoring. Service interface management includes enabling service APIs and handling proxy management interfaces. Service orchestration includes maintaining the interoperability management of the IoT Management platform 500.

The digital support module 208 is responsible for maintaining security support, provisioning, policy management, consumption management, problem management, among other management services. The digital support module 208 also includes a communication selection interface to maintain communication across different protocols.

The device environment management module 502 is responsible for maintaining and controlling different sets of functions such as device management, device environment management, remote actions, application management, platform support, and security maintenance.

Device management functions include but are not limited to device discovery, device enablement, monitoring and reporting, and configuration management. Device environment management functions include but are not limited to sandbox management, upgrades management, and data management. Remote actions facilitation by the device environment management module 502 include but are not limited to activating and configuring, locking and unlocking and so on.

The device environment management module 502 is additionally responsible for application management and platform support functions such as application enablement, end user policy enforcement, multiplatform support, native client support, and so on.

The service registry module 504 maintains the service management ecosystem of the IoT platform 500 by maintaining subscription management and service management. The service registry module 504 also enables functioning of a proxy management interface and a service enablement API while also maintaining the service lifecycle management.

Figure 6:
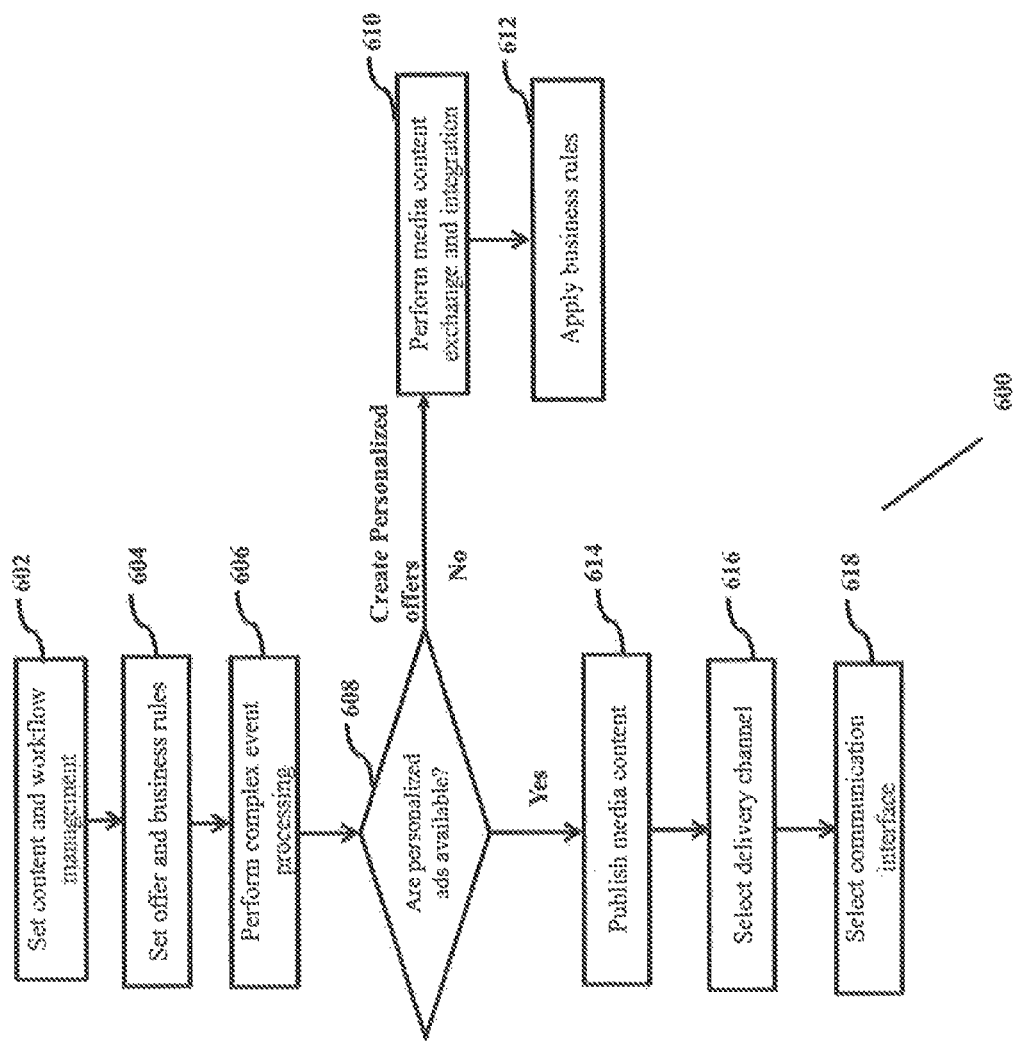
FIG. 6 is a flow diagram depicting the process of creating a digital identity, according to the embodiments as disclosed herein.

FIG. 6 is a flow diagram depicting the process of creating a digital identity, according to the embodiments as disclosed herein. The embodiments of flow diagram shall be described with a use case scenario.

Use Case Scenario:

User X, a technology professional working for an organization prefers to use the user equipment 108 in order to work from a plurality of locations. One particular day, before leaving for location x, user x was watching highlights of a tennis match on the user equipment 108, that was played the previous night.

While watching the highlights, user x happened to watch advertisements of similar products that were searched on the user equipment 108 on a plurality of websites. Before leaving for location Y, user X switches on a home security system on the IoT platform 500. On the way to location Y, user x stops at the gas station to refuel his commuting vehicle. In order to pay for the fuel, user X taps his user equipment 108 at the fuel station that further triggers the application which requires the fingerprint of user X to authenticate and make the payment.

In order to push personalized advertisements to the user equipment of user X, it is initially necessary to gather certain information regarding predefined offers and applied business rules, along with real time activity and the digital identity of user X. Creating a digital identity of user X helps in understanding certain characteristics and creating a persona of user X based on which a plurality of professional advertisements are pushed.

In order to obtain the relevant information regarding predefined offers and business rules, a sales and marketing module (not shown in Figure) triggers a campaign management module (not shown in Figure) to design certain offers and discount rules for User X. This information is transferred through a business rules engine that checks for predefined rules by User X and additionally checks for the validity of offers or discounts. Similarly, to obtain information regarding real time activities by User X, a communication selection interface senses for communication and passes the information to a Machine to Machine (M2M) module (not shown in Figure) that further processes and sends it to a complex event processing module.

Further, the complex event processing module senses the user equipment 108, the network 106, service and sensor triggers and then forwards real time activity information to an analytics module (not shown in Figure).

The analytics module then stitches real time information along with certain predefined offers and other rules in order to assist in shortlisting advertisement based on those parameters. The information gathered from the analytics module is forwarded to the Digital Identity platform 300.

As depicted in FIG. 6, at step 602 content and workflow management rules are set by the digital identity platform 600 followed by offer and business rules at step 604. At step 606, complex event processing is performed. At step 608, a check is performed to determine if personalized advertisements are available. If there are no personalized advertisements available then media content exchange and integration is performed at step 610. Business rules are applied at step 612 In case, personalized advertisements are available then media content is published at step 614 and a delivery channel is selected at step 616 followed by the step of selecting a communication interface at step 618. It will be noted herein that various actions/steps in method 600 may be performed in the order presented, in a different order or simultaneously. Further, in some embodiments, some actions listed in FIG. 6 may be omitted.

What is claimed is:

1. A computer implemented method for creating and facilitating interoperability in an integrated digital platform, said method comprising:
   generating and maintaining a plurality of application specific functions by a digital application module;
   determining whether an invoking mechanism is triggered and maintaining functioning of an invoking mechanism by an operations application module;
   enabling a plurality of applications for at least one of subscribing and un-subscribing enabling;
   providing connectivity and maintaining plurality of application configuration parameters for supporting a network infrastructure of said integrated digital platform, wherein each of the plurality of application configuration parameters comprise parameters associated with content management, security support, catalog management, multiplatform support, native client support, notifications support, process management, problem management, order management, and performance management;
   externalizing a plurality of platform services and provide a proxy management support when said platform services are exposed;
   providing a plurality of security management functionalities comprising at least one of authentication, authorization and accounting, identity control, key exchange control, license control and trust control; and
   processing an intelligent schema based on a request of said subscriber provider to create a deployable integrated digital platform.

2. The computer implemented method as claimed in claim 1, further comprising designing, managing, and controlling a plurality of computing devices in a seamless manner.

3. The computer implemented method as claimed in claim 1, further comprising facilitating a plurality of digital services in at least one of a bundled and standalone manner.

4. The computer implemented method as claimed in claim 1, further comprising creating an end user application in real time by utilizing a flexible and extensible API driven digital platform.

5. The computer implemented method as claimed in claim 1, further comprising designing, managing and controlling access of a plurality of end point devices.

6. The computer implemented method as claimed in claim 1, further comprising provisioning at least one of devices, services, and applications by a central provisioning support console.

7. The computer implemented method as claimed in claim 1, further comprising providing a digital identity recognition functionality for facilitating at least one of accessing, delivering, personalizing digital services.

8. The computer implemented method as claimed in claim 1, further comprising a plurality of analytic capabilities including at least one of log analytics, device analytics, usage analytics, and presence analytics.

9. A system for creating and facilitating interoperability in an integrated digital platform, said system comprising:
   one or more processors; and
   a memory communicatively coupled to the one or more processors, wherein the one or more processors are capable of executing programmed instructions stored in the memory to:
   develop and maintain a plurality of application specific functions;
   check whether an invoking mechanism is triggered and maintain functioning of said invoking mechanism;
   enable a plurality of applications for at least one of subscribing and un-subscribing enabling;
   provide connectivity and inter connect plurality of application configuration parameters for supporting a network infrastructure of said integrated digital platform, wherein each of the plurality of application configuration parameters comprise parameters associated with content management, security support, catalog management, multiplatform support, native client support, notifications support, process management, problem management, order management, and performance management;
   externalize a plurality of platform services and provide a proxy management support when said platform services are exposed;

provide a plurality of security management functionalities comprising at least one of authentication, authorization and accounting, identity control, key exchange control, license control and trust control; and provide and process an intelligent schema based on a request of said subscriber provider to create a deployable integrated digital platform associated with the plurality of application configuration parameters.

10. The system as claimed in claim 9, wherein the one or more processors provides a set of content management capabilities to manage and deliver content to develop at least one end application.

11. The system as claimed in claim 10, wherein said at least one end application is developed based on a plurality of digital functionalities, wherein said plurality of digital functionalities comprises at least one of device analytics, remote action security, security support, billing, regulatory, and compliance.

12. The system as claimed in claim 9, wherein said one or more processors perform at least one of zero-touch configuration and upgrade management on a periodical basis.

13. The system as claimed in claim 9, wherein said one or more processors implement a central provisioning support console for provisioning at least one of devices, services, and application.

14. The system as claimed in claim 9, wherein said one or more processors provide a plurality of identity functionalities for at least one of accessing, delivering, and personalizing enterprise services.

15. The computer implemented system as claimed in claim 9, wherein said one or more processors for designing, managing, and controlling a plurality of heterogeneous devices, connections, and services in a seamless manner.

* * * * *